United States Patent [19]
Colby et al.

[11] Patent Number: 5,276,089
[45] Date of Patent: Jan. 4, 1994

[54] COMPATIBLE POLYESTER BLENDS

[75] Inventors: Ralph H. Colby, Rochester; Christine J. T. Landry; Michael R. Landry, both of Honeoye Falls; Timothy E. Long, Hilton; Dennis J. Massa, Pittsford; David M. Teegarden, Rochester, all of N.Y.

[73] Assignee: Eastman Kodak Company, Rochester, N.Y.

[21] Appl. No.: 749,812

[22] Filed: Aug. 26, 1991

[51] Int. Cl.$^5$ ............ C08L 67/02; C08L 69/00; C08L 71/12; C08L 25/06

[52] U.S. Cl. ........................ 525/67; 525/64; 525/68; 525/92; 525/132; 525/133; 525/146; 525/166; 525/175; 525/176

[58] Field of Search .......... 525/133, 68, 92, 67, 525/64, 166

[56] References Cited

U.S. PATENT DOCUMENTS 4,866,126 9/1989 Mylonakis ............... 525/68
4,885,334 12/1989 Mayumi ............... 525/66

FOREIGN PATENT DOCUMENTS 0274140 7/1988 European Pat. Off. .

OTHER PUBLICATIONS

D. R. Paul and S. Newman, eds., Polymer Blends, vols. 1-2, New York, Academic Press, 1978; N. G. Gaylord, J. Macramol. Sci. Chem., A26(8), 1211 (1989).

*Primary Examiner*—Patricia A. Short
*Attorney, Agent, or Firm*—Judith A. Roesler

[57] ABSTRACT

There is disclosed a blend of certain polyesters and polymers that are miscible with polystyrene, such as polyphenylene oxide. The blend is characterized by the presence of a compatibilizing amount of a copolymer having repeating units derived from an aromatic vinyl compound monomer and a vinylphenol monomer. The polyester is thermoplastic and is characterized in that the diacid component of the polyester includes aromatic groups and the diol component comprises at least about 20 percent by weight of a noncyclic, aliphatic diol.

10 Claims, No Drawings

COMPATIBLE POLYESTER BLENDS

The present invention is related to copending commonly assigned U.S. Ser. No. 07/749,821 entitled POLYESTER/POLY(VINYLPHENOL) BLENDS, filed on even date herewith.

FIELD OF THE INVENTION

The present invention is directed to blends of certain polymers. The blends are compatible and find many uses such as packaging applications owing to their chemical resistance and toughness.

BACKGROUND OF THE INVENTION

Polymer blends are a route to novel and useful materials having improved properties, such as easier processing, better mechanical properties, chemical resistance and lower cost. When two polymers are blended, however, owing to their usually inherent incompatibility, their blend physical properties may be poor. It is desirable and often necessary to add a third constituent, called a compatibilizer, whose purpose it is to improve the blend properties. (D. R. Paul and S. Newman, eds., Polymer Blends, Vols. 1-2, New York, Academic Press, 1978.; N. G. Gaylord, J. Macromol. Sci. Chem., A26(8), 1211 (1989).) Compatibilizers are typically either random, graft, or block copolymers. Reference is also made to U.S. Pat. Nos. 4,885,334 and 4,886,126 for compositions of this general type.

For example, it is known to use a compatibilizer in admixture with a blend of a polyphenylene oxide polymer and a styrene acrylonitrile polymer. The compatibilizer is a block copolymer of styrene and acrylonitrile. Reference is made to U.S. Pat. No. 4,866,126. Block copolymer compatibilizers for a blend of polyphenylene oxides and a "polar thermoplastic resin", which can be a polyester, are described in U.S. Pat. No. 4,885,334. The compatibilizer is a modified block copolymer obtained by subjecting a hydrogenated block copolymer comprising an aromatic vinyl compound polymer block (e.g. derived from styrene) and a conjugated diene compound polymer block (e.g. 1,3, butadiene) to graft polymerization in the presence of a monomer having an epoxy group (e.g. glycidyl methacrylate).

Compatible blends of poly(2,6-dimethyl-1,4-phenylene oxide), with polyesters, having improved impact strength and solvent resistance have been reported previously. Improved tensile properties strength, moldability, flexural modulus, compounding, and smoothness have also been reported.

We have found that blends of certain polyesters with phenylene oxide containing polymers have brittle mechanical properties. Thus, it would be desirable to have a compatibilizer that, when added to these blends, improves their mechanical properties and allows the potential advantages of these blends—e.g., easier processing than phenylene oxide containing polymers, higher thermal dimensional stability than the polyesters alone, and lower cost than phenylene oxide containing polymers—to be realized.

SUMMARY OF THE INVENTION

We have found that the presence of a poly(styrene-b-vinylphenol) block copolymer(I), poly(vinylphenol-g-styrene) graft copolymer(II), or poly(styrene-co-vinylphenol) random copolymer(III) compatibilizer in extruded blends of phenylene oxide containing polymers with certain polyesters results in significantly improved mechanical properties—specifically, higher yield stress, higher strength, and higher elongation at break and work to break (toughness).

Thus, in accordance with the present invention there is provided a polymer blend composition comprising a polymer that is miscible with polystrene and a thermoplastic polyester wherein the diacid component of said polyester includes aromatic groups and wherein the diol component comprises at least about 20 percent by weight of a noncyclic, aliphatic diol, said blend further comprising a copolymer compatibilizer in an amount sufficient to effect compatibility between said polymer that is miscible with polystyrene and said polyester, said compatibilizer comprising a copolymer having repeating units derived from an aromatic vinyl compound monomer and a vinylphenol monomer.

Examination of fracture surfaces and cross-sections of the compatibilized blends of the invention by electron microscopy reveals that interfacial adhesion and blend dispersion are improved by the addition of the compatibilizer. While the basis for the improved properties is not fully understood, it is believed to result at least in part from the improved interfacial adhesion between the two major polymer constituents promoted by the specific affinities of the poly(vinylphenol) portion of the compatibilizer for the polyester phase and the polystyrene segment for the phase containing phenylene oxide containing polymers.

DETAILED DESCRIPTION OF THE INVENTION

One component of the blend of the invention is a polymer that is miscible with polystyrene, such as polyphenylene oxide (IV). Useful polyphenylene ether containing polymers are described, for example in the above referenced U.S. Pat. No. 4,885,334 at Col. 1-Col. 2. These polymers are obtained by the polycondensation of one or a mixture of phenols represented by the formula:

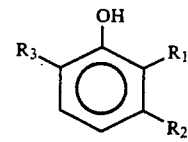

wherein $R_1$ represents a lower alkyl group having from 1 to about 3 carbon atoms and $R_2$ and $R_3$ each independently represent a hydrogen atom or a lower alkyl group having from 1 to about 3 carbon atoms.

Alternatives to polyphenylene oxide include polystyrene, high-impact polystyrene, tetramethyl-bisphenol-A polycarbonate, poly(vinyl methyl ether), and blends of polyphenylene ethers with polystyrene, and styrene-containing copolymers.

One of the components of the blend of the present invention is a thermoplastic polyester wherein the diacid component of the polyester includes aromatic groups and wherein the diol component of the polyester comprises at least about 20 mole percent of a noncyclic, aliphatic diol. The diacid component will be considered to be aromatic if at least about 50 mole percent of the diacid is aromatic. As is well known in the polyester art, mixtures of diacids can be used. Particularly useful diacid components result in repeating units represented by the formula:

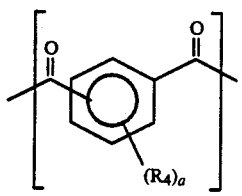

OR

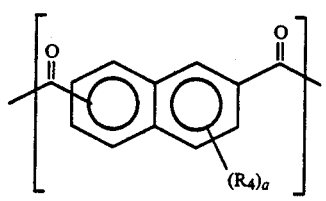

wherein a is an integer of from 1 to 4 and each $R_4$ is independently selected from the group consisting of hydrogen; alkyl groups having from 1 to about 4 carbon atoms, for example methyl, ethyl and t-butyl; and halogen, particularly bromo and chloro.

Particularly useful diacid components are derived from acids which include:

phthalic acid; isophthalic acid; terephthalic and naphthoic acid.

The second component of the polyester is a noncyclic diol component. As noted, the diol component can include up to about 80 mole percent of a cyclic component. Useful diol components result in repeating units having the structure:

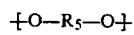

wherein $R_5$ represents a straight or branched alkylene group of from 1 to about 10 carbon atoms, for example, ethyl, butyl and neopentyl.

Other diols which can be used up to about 80 mole percent include cyclic diols resulting in repeating units having the formula:

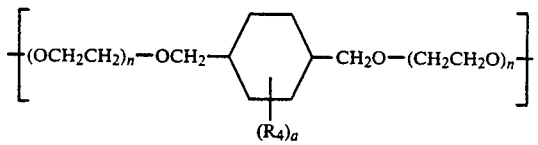

wherein n is 0 to 2 and a is an integer from 1 to 4 and each $R_4$ is independently selected from the group consisting of hydrogen; alkyl groups having from 1 to about 4 carbon atoms, for example methyl, ethyl and t-butyl; and halogen, particularly bromo and chloro.

Other useful diols result in repeating units having the formula:

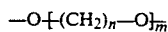

wherein n is an integer from 2 to about 4 and m is an integer from 2 to about 15.

Particularly useful diol components are derived from diols which include:

ethylene glycol, butanediol, cyclohexylene dimethanol, 1,2-propanediol and neopentyl glycol.

In the present invention, by miscible it is meant that the blended polymers form a homogeneous blend that has a single glass transition temperature. In addition, amorphous miscible blends are clear. In a typical test for clarity a blend of interest is coated or cast into a thin film. A blend is considered to be clear if ordinary newsprint can be read through the film. Immiscible blends are those that have more than one glass transition temperature or are opaque or show two distinct solid state NMR relaxation times.

The term compatible is a more general term typically meaning that the components mix and process without difficulty and have good material properties. The polyesters that are useful in the invention can be made by methods which are extremely well known in the art. In fact, many of the useful polyesters are commercially available. Useful polyesters are commercially available from the Eastman Kodak Company under the trade names TENITE®, KODAK KODAPAK®, EKTAR PCTG® and EKTAR HPETG®.

Particularly useful polyesters include:

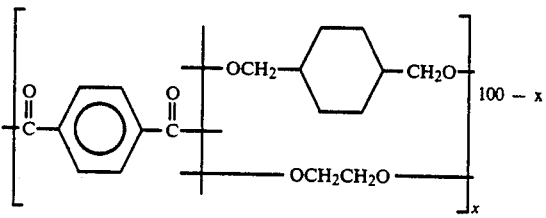

EKTAR PCTG® 10179 (where x = 20) (Examples, Table VI)
EKTAR PCTG® 5445 (where x = 34) (Examples, Table X)
EKTAR PETG® 6763 (where x = 66) (Example, Table XI)
PET (where x = 100) (Examples, Table IV)

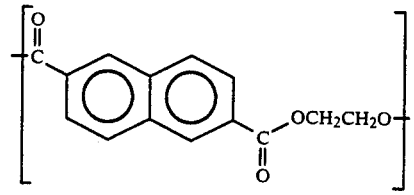

Referred to in the Examples as "PEN"

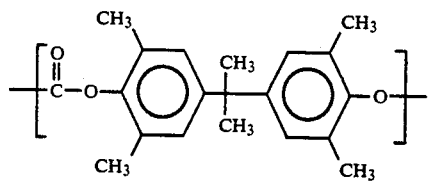

Referred to in the Examples as "TMBPA-PC" (Examples, Table III)

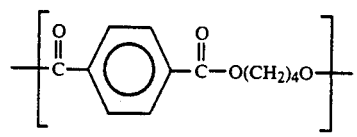

Referred to in the Examples as "PBT" (Examples, Table V)

The blend of the invention further comprises a compatibilizer. The compatibilizer is a copolymer having repeating units derived from an aromatic vinyl compound monomer and a vinylphenol monomer. The aromatic vinyl compound monomer can be represented by the formula:

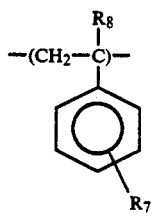

wherein $R_6$ and $R_7$ are independently selected from the group consisting of a hydrogen atom, a lower alkyl group having from 1 to about 6 carbon atoms, a chlorine atom and a bromine atom.

Useful vinyl aromatic monomers include styrene, p-methylstyrene, α-methylstyrene, t-butylstyrene and copolymers.

The currently preferred monomer is styrene because it is inexpensive and readily available.

The other component of the compatibilizer useful in the invention is a poly(vinylphenol). These polymers include repeating units derived from vinylphenol or derivatives thereof. Useful repeating units are derived from vinylphenol or derivatives of vinylphenol where the hydrogen of the hydroxy group is replaced with a group such as metal ions, silyl or organic groups such as tertiary-butyloxycarbonyloxy (tBOC), alkyl, alkanoyl, and benzoyl. These repeating units can be represented by the formula:

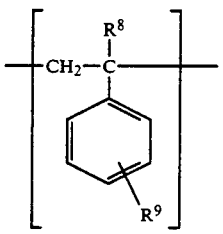

wherein $R^8$ is hydrogen or methyl and $R^9$ is selected from the group consisting of —OH, —OSi($R^{10}$)3 and —OM where M is a metal cation, tBOC, $OR^{10}$ and $OCOR^{10}$, where $R^{10}$ is selected from alkyl groups having about 1 to 5 carbon atoms or aryl. In the above formula, M can be any univalent or divalent alkali, alkaline earth or transition metal cation. Non-limiting examples of such cations include sodium, magnesium, calcium, lithium, potassium and zinc cations. Where the group is not a hydroxy group, it is preferred to convert it to a hydroxy group. That is, the other alternatives to phenol itself are precursors to vinylphenol containing polymers.

It is contemplated that $R^9$ in the formula above can be located in either the para- or meta-position. It is preferred, primarily for reasons of availability of starting materials and ease of synthesis, that $R^9$ be located in the para- position. Additionally, it is contemplated that, in addition to the $R^9$ substituent, the pendant benzene ring can be substituted with such non-interfering substituents as C1-C4 alkyl, or halogen in one or both meta positions.

The styrene-vinylphenol block copolymer compatibilizers can be prepared by the method of Nakahama disclosed in *Yuki Gosei Kacaku* Vol. 47, pp. 448–456 (1989); *American Chemical Society Polymer Preprints*, Vol 27, No. 1, pp. 194–5 (1986); and Japanese Kokai 59-53509 (1984).

Graft copolymer compatibilizers can be prepared by conventional free radical copolymerization of a methacryl-terminated polystyrene macromonomer and a suitably protected vinylphenol monomer. Poly(vinylphenol) homopolymer and random copolymers(III) can also be prepared by conventional free radical polymerization.

The preferred range for the molecular weight of the vinylphenol containing copolymer is between about 1,500 and about 500,000. Particularly preferred are vinylphenol polymers having a molecular weight between about 20,000 and about 250,000. The preparation of high molecular weight vinylphenol containing polymers is described in: Frechet et al; NOVEL DERIVATIVES OF POLY(4-HYDROXYSTYRENE) WITH EASILY REMOVABLE TERTIARY, ALLYLIC OR BENZYLIC ETHERS; *Polymer Bulletin* 20, 427–434 (1988).

The blends of the invention can be made by methods which are well known in the art. These thermoplastic blends, for example, can be made by mixing powders of the blend components together and then melt extruding the mixture in a screw extruder. In another method, both components are dissolved in a common solvent, for example dioxane, pyridine or tetrahydrofuran, and then precipitated in a non-solvent for both of the polymers, such as for example hexane. In another method, both components are dissolved in a common solvent and solvent cast onto an inert substrate.

Examples 1–5

PCTG5445/PPO with and without block, graft and random copolymer compatibilizers containing vinylphenol and styrene.

An Eastman polyester, EKTAR PCTG ® 5445 (hereinafter "PCTG 5445. as described above), was obtained in pellet form, was then ground in a grinder in the presence of liquid nitrogen, and was then forced through a fine-mesh strainer and subsequently dried overnight at 105° C. in vacuum. Poly(2,6-dimethyl-1,4-phenylene oxide), (IV, also referred to as "PPO ®"), was obtained in fine powder form and used as received after drying for 5 days at 105° C. in vacuum. Poly(styrene-b-vinylphenol), (I), prepared by the method of Nakahama (referenced above) was received in powder form, and was dried overnight at 115° C. in vacuum. A dry blend was prepared of 9.7 g PCTG 5445, 9.7 g (IV), and 0.85 g (I) by stirring and shaking in a bottle. A film of this blend was then melt extruded at 260° C. on a laboratory extruder equipped with a ¼-in screw and 2-in slit die. Continuous films approximately 2" wide and 0.015" to 0.025" thick were obtained. The same procedure was followed to prepare a 1/1 by weight melt-extruded blend of EKTAR PCTG ® 5445 and (IV) without added (I). The process was repeated using compatibilizers II, III and poly(vinylphenol) homopolymer (for comparison).

The mechanical properties of the two blends prepared as described above were determined using the ASTM D638M-III Tensile Test (Small Dogbone), on a Sintech Model 20 mechanical testing apparatus. The results are listed in Table I. The yield stress σy, stress at break Γb, elongation to break εb, and work to break $w_b$ all improve (significantly increase) with added compatibilizer (I, II and III). The modulus was also found to be slightly higher with added compatibilizer.

Additional evidence for the efficacy of the added compatibilizer was found by examining the fracture surfaces of the specimens after testing to fracture, using scanning electron microscopy. The blend without added compatibilizer has poor adhesion between the phases, while the blend with added compatibilizer has a rough surface characteristic of ductile fracture and shows no evidence of interfacial failure between phases. Both blends, with and without added compatibilizer, are phase separated and show two glass transition temperatures by differential scanning calorimetry (87° C. and 207° C. with compatibilizer, and 87° C. and 211° C. without compatibilizer present).

Example 6

Compatibilized 0.25/0.25/0.50 blends of Poly(2,6-dimethyl-1,4-phenylene oxide)/Polystyrene/PCTG 5445.

15g of molding grade polystyrene (PS) was ground as described in Example 1 and mixed with 15 gm of PPO ®, dried in vacuum, and extruded at about 276° C. The resulting clear 1/1 blend was then reground for further extrusion. 10g of the reground PS/PPO blend was then combined with 10g of PCTG 5445 polyester and extruded under the same conditions. Another blend having the same 0.25/0.25/0.5 composition but containing 4.3-wt % poly(styrene-b-vinylphenol) block copolymer compatibilizer (I) was prepared by combining 9.7g of PPO/PS, 9.7g PCTG 5445, and 0.87g poly(styrene-b-vinylphenol) and extruding under the same conditions. The mechanical properties for these blends are reported in Table II and show more than a factor of 10 increase in strain at break and work-to-break (toughness) in the blend having the added block copolymer compatibilizer.

Example 7

Compatibilized 1/1 blends of TMBPA-PC with PCTG 5445

10g of TMBPA-PC (as described above) and 10g PCTG 5445 were ground as described in Example 1, mixed, dried in vacuum, and extruded at 276° C. Another blend having the same composition but containing 4.3-wt % poly(styrene-b-vinylphenol) block copolymer compatibilizer was prepared by combining 9.7g of TMBPA-PC, 9.7g PCTG 5445, and 0.87g poly(styrene-b-vinylphe-nol) and extruding under the same conditions. The mechanical properties for these blends are reported in Table III and show improved strength and toughness (stress at break and work-to-break) in the blend having the added block copolymer compatibilizer. Other examples of the invention.

Examples 8–17

Ten other examples of PPO/polyester blends were prepared and tested as in Example 1. Their compositions and mechanical properties are listed in Tables IV–VIII.

TABLE I

Mechanical properties of 1:1 extruded blends of PPO with EKTAR PCTG ® 5445, with and without added compatibilizer (extrusion direction)

| Blend Compatibilizer | Stress at break $\sigma_b$, MPa | Strain at break $\epsilon_b$, % | Yield stress, $\sigma_y$, MPa | Tensile Modulus, MPa | Work to break, $w_b$, MPa |
|---|---|---|---|---|---|
| None-Comparison | 30 ± 2 | 7 ± 3 | 31 ± 3 | 1000 ± 70 | 2 ± 1 |
| Example 1 2.0% P(S-b-VPh) Block[a] (I) | 29 ± 3 | 25 ± 17 | 31 ± 3 | 1150 ± 110 | 7 ± 6 |
| Example 2 4.2% P(S-b-VPh) Block[a] (I) | 41 ± 6 | 59 ± 18 | 40 ± 4 | 1200 ± 100 | 22 ± 9 |
| Example 3 4.2% P(VPh-g-S) Graft[b] (II) | 41 ± 8 | 61 ± 24 | 36 ± 4 | 1400 ± 100 | 22 ± 11 |
| Example 4 4.2% P(S-co-VPh) Random[c] (III) | 35 ± 2 | 36 ± 9 | 37 ± 2 | 1400 ± 40 | 12 ± 3 |
| Comparative Example 5 4.2% PVPh Homopolymer | 29 ± 2 | 7 ± 3 | 30 ± 3 | 1200 ± 100 | 2 ± 1 |

[a]36-wt % vinylphenol and 64-wt % styrene
[b]71-wt % vinylphenol and 29-wt % styrene
[c]46-wt % vinylphenol and 54-wt % styrene

TABLE II

Mechanical properties of extruded 0.25/0.25/0.50 blends of PPO/PS/EKTAR PCTG ® 5445 (extrusion direction). Effect of added compatibilizer (I).

| Blend Compatibilizer | Stress at break $\sigma_b$, MPa | Strain at break $\epsilon_b$, % | Yield stress, $\sigma_y$, MPa | Tensile Modulus, MPa | Work to break, $w_b$, MPa |
|---|---|---|---|---|---|
| None-Comparison | 35 ± 2 | 2.5 ± 0.4 | None | 1480 ± 120 | 0.5 ± 0.1 |
| Example 6 4.3% P(S-b-VPh) Block[a] (I) | 39 ± 2 | 32 ± 29 | 43 ± 2 | 1320 ± 70 | 12 ± 11 |

[a]26-wt % vinylphenol and 73-wt % styrene

TABLE III

Mechanical properties of extruded blends of TMBPA-PC with PCTG5445 (extrusion direction). Effect of added poly(styrene-b-vinylphenol) compatibilizer (I).

| Blend Compatibilizer | Stress at break $\sigma_b$, MPa | Strain at break $\epsilon_b$, % | Yield stress $\sigma_y$, MPa | Tensile Modulus, MPa | Work to break, $w_b$, MPa |
|---|---|---|---|---|---|
| TMBPA-PC/5445 1/1 Comparison | 35 ± 7 | 42 ± 23 | 35 ± 7 | 1260 ± 90 | 14 ± 8 |
| Example 7 TMBPA-PC/5445/ Block[a] (I) 0.48/0.48/ | 42 ± 28 | 52 ± 20 | 36 ± 5 | 1450 ± 130 | 18 ± 8 |

TABLE III-continued

Mechanical properties of extruded blends of TMBPA-PC with PCTG5445 (extrusion direction). Effect of added poly(styrene-b-vinylphenol) compatibilizer (I).

| Blend Compatibilizer | Stress at break $\sigma_b$, MPa | Strain at break $\epsilon_b$, % | Yield stress $\sigma_y$, MPa | Tensile Modulus, MPa | Work to break, $w_b$, MPa |
|---|---|---|---|---|---|
| 0.043 | | | | | |

[a] 26-wt % vinylphenol and 74-wt % styrene

TABLE IV

Mechanical properties of extruded blends of PET with PPO (extrusion direction). Effect of added poly(styrene-b-vinylphenol) compatibilizer (I).

| Blend Compatibilizer | Stress at break $\sigma_b$, MPa | Strain at break $\epsilon_b$, % | Yield stress $\sigma_y$, MPa | Tensile Modulus, MPa | Work to break, $w_b$, MPa |
|---|---|---|---|---|---|
| PPO/PET 1/1-Comparison | 18 ± 3 | 1.8 ± 0.3 | None | 1040 ± 90 | 0.18 ± 0.06 |
| Example 8 PPO/PET/Block[a] (I) 0.48/0.48/0.042 | 41 ± 4 | 3.4 ± 0.5 | None | 1390 ± 110 | 0.8 ± 0.2 |

[a] 36-wt % vinylphenol and 64-wt % styrene

TABLE V

Mechanical properties of extruded blends of PBT with PPO (extrusion direction). Effect of added poly(styrene-b-vinylphenol) compatibilizer (I).

| Blend Compatibilizer | Stress at break $\sigma_b$, MPa | Strain at break $\epsilon_b$, % | Yield stress $\sigma_y$, MPa | Tensile Modulus, MPa | Work to break, $w_b$, MPa |
|---|---|---|---|---|---|
| PPO/PBT 1/1 Comparison | 15 ± 3 | 1.6 ± 0.2 | None | 980 ± 90 | 0.13 ± 0.04 |
| Example 9 PPO/PBT/Block[a] (I) 0.48/0.48/0.042 | 36 ± 3 | 3.0 ± 0.2 | None | 1330 ± 50 | 0.59 ± 0.08 |

[a] 36-wt % vinylphenol and 64-wt % styrene

TABLE VI

Mechanical properties of extruded blends of PEN with PPO (extrusion direction). Effect of added poly(styrene-b-vinylphenol) compatibilizer (I).

| Blend Compatibilizer | Stress at break $\sigma_b$, MPa | Strain at break $\epsilon_b$, % | Yield stress $\sigma_y$, MPa | Tensile Modulus, MPa | Work to break, $w_b$, MPa |
|---|---|---|---|---|---|
| PEN/PPO 1/1 Comparison | 28 ± 5 | 2.9 ± 0.3 | None | 1070 ± 130 | 0.45 ± 0.12 |
| Example 10 PEN/PPO/Block[a] (I) 0.48/0.48/0.042 | 47 ± 8 | 4 ± 1 | 46 ± 5 | 1460 ± 190 | 1.1 ± 0.5 |

[a] 26-wt % vinylphenol and 64-wt % styrene

TABLE VII

Effect of poly(vinylphenol-g-styrene) compatibilizer (II) concentration on mechanical properties of 1:1 PPO/PCTG5445 blends (extrusion direction).

| Blend Compatibilizer | Stress at break $\sigma_b$, MPa | Strain at break $\epsilon_b$, % | Yield stress $\sigma_y$, MPa | Tensile Modulus, MPa | Work to break, $w_b$, MPa |
|---|---|---|---|---|---|
| None-Comparison | 30 ± 2 | 7 ± 3 | 31 ± 3 | 1000 ± 70 | 2 ± 1 |
| Example 11 2.1% P(VPh-g-S) Graft[a] (II) | 36 ± 4 | 41 ± 29 | 37 ± 2 | 1140 ± 70 | 14 ± 11 |
| Example 12 4.2% P(VPh-g-S) Graft[a] (II) | 40 ± 3 | 70 ± 37 | 38 ± 1 | 1170 ± 40 | 25 ± 14 |
| Example 13 10% P(VPh-g-S) Graft[a] (II) | 39 ± 3 | 46 ± 32 | 40 ± 4 | 1190 ± 40 | 17 ± 12 |
| Example 14 20% P(VPh-g-S) Graft[a] (II) | 27 ± 3 | 17 ± 12 | 30 ± 4 | 1010 ± 80 | 4.5 ± 3.8 |

[a] 42-wt % vinylphenol and 58-wt % styrene

TABLE VIII

Effects of composition and concentration of poly(styrene-co-vinylphenol) random copolymer (III) compatibilizer on mechanical properties of 1:1 PPO/PCTG5445 blends (extrusion direction).

| Blend Compatibilizer | Stress at break $\sigma_b$, MPa | Strain at break $\epsilon_b$, % | Yield stress $\sigma_y$, MPa | Tensile Modulus, MPa | Work to break, $w_b$, MPa |
|---|---|---|---|---|---|
| None-Comparison | 30 ± 2 | 7 ± 3 | 31 ± 3 | 1000 ± 70 | 2 ± 1 |
| Example 15 4.2% P(S-co-VPh) Random[a] (III) | 31 ± 7 | 24 ± 24 | 33 ± 8 | 990 ± 130 | 8 ± 9 |
| Example 16 10% P(S-co-VPh) Random[b] (III) | 40 ± 3 | 7 ± 2 | 46 ± 2 | 1100 ± 100 | 2.0 ± 0.9 |

[a] 25-wt % vinylphenol and 75-wt % styrene
[b] 46-wt % vinylphenol and 64-wt % styrene Examples 17–22

Six additional blends were prepared in a manner similar to Example 1.

TABLE IX

Effects of blends composition and 4.2-wt % added poly(vinylphenol-g-styrene) compatibilizer (II) on mechanical properties of PPO/PCTG5445 blends (extrusion direction).

| Blend Composition | Stress at break $\sigma_b$, MPa | Strain at break $\epsilon_b$, % | Yield stress, $\sigma_y$, MPa | Tensile Modulus, MPa | Work to break, $w_b$, MPa |
|---|---|---|---|---|---|
| 10/90 PPO/ PCTG5445 Comparison | 24 ± 2 | 17 ± 22 | 32 ± 2 | 1020 ± 70 | 4 ± 6 |
| Example 17 10/90 PPO/ PCTG5445 with Graft Compatibilizer[a] (II) | 26 ± 4 | 62 ± 39 | 29 ± 6 | 1080 ± 80 | 11 ± 5 |
| 30/70 PPO/ PCT5445 Comparison | 34 ± 2 | 4.4 ± 0.8 | 36 ± 4 | 1170 ± 70 | 1.1 ± 0.3 |
| Example 18 30/70 PPO/ PCT5445 with Graft Compatibilizer[a] (II) | 30 ± 1 | 14 ± 7 | 38 ± 2 | 1220 ± 70 | 4 ± 2 |
| 50/50 PPO/ PCT5445 Comparison | 38 ± 3 | 4.6 ± 0.7 | 40 ± 3 | 1280 ± 80 | 1.1 ± 0.3 |
| Example 19 50/50 PPO/ PCT5445 with Graft Compatibilizer[a] (II) | 36 ± 2 | 19 ± 16 | 40 ± 1 | 1400 ± 50 | 7 ± 6 |

[a]15-wt % vinylphenol and 85-wt % styrene

TABLE X

Mechanical properties of extruded 1/1 blends of PPO with PCTG10179. Effects of 4.2-wt % added poly(vinylphenol-g-styrene) compatibilizer (II) (Extrusion Direction).

| Blend Composition | Stress at break $\sigma_b$, MPa | Strain at break $\epsilon_b$, % | Yield stress, $\sigma_y$, MPa | Tensile Modulus, MPa | Work to break, $w_b$, MPa |
|---|---|---|---|---|---|
| PPO/ PCTG10179 1/1 Comparison | 35 ± 6 | 3.6 ± 0.7 | None | 1200 ± 100 | 0.8 ± 0.3 |
| Example 20 PPO/ PCTG10179/ (II) Graft[a] 0.48/0.48/.042 | 36 ± 1 | 15 ± 12 | 39 ± 2 | 1410 ± 30 | 5 ± 4 |

[a]15-wt % vinylphenol and 85-wt % styrene

TABLE XI

Mechanical properties of extruded 1/1 blends of PPO with PETG6763. Effects of 4.2-wt % added poly(styrene-b-vinylphenol) compatibilizer (I) (Extrusion Direction).

| Blend Composition | Stress at break $\sigma_b$, MPa | Strain at break $\epsilon_b$, % | Yield stress, $\sigma_y$, MPa | Tensile Modulus, MPa | Work to break, $w_b$, MPa |
|---|---|---|---|---|---|
| PPO/ PCTG6763 1/1 | 39 ± 3 | 3.8 ± 0.6 | None | 1200 ± 100 | 0.8 ± 0.3 |
| Comparison Example 21 PPO/ PETG6763/ (I) Block[a] 0.48/0.48/.042 | 41 ± 3 | 64 ± 46 | 43 ± 3 | 1520 ± 50 | 24 ± 18 |

[a]36-wt % vinylphenol and 64-wt % styrene

TABLE XII

Mechanical properties of extruded 1/1 blends of polystyrene with PCTG5445. Effects of 4.2-wt % added poly(styrene-b-vinylphenol) compatibilizer (I) (Extrusion Direction).

| Blend Composition | Stress at break $\sigma_b$, MPa | Strain at break $\epsilon_b$, % | Yield stress, $\sigma_y$, MPa | Tensile Modulus, MPa | Work to break, $w_b$, MPa |
|---|---|---|---|---|---|
| PS/ PCTG5445 1/1 Comparison | 38 ± 6 | 3.3 ± 0.4 | None | 1500 ± 200 | 0.8 ± 0.2 |
| Example 22 PS/ PCTG5445/ (I) Block[a] 0.48/0.48/.042 | 30 ± 5 | 13 ± 8 | 40 ± 3 | 1580 ± 80 | 4 ± 2 |

[a]36-wt % vinylphenol and 64-wt % polystyrene

The invention has been described with particular reference to preferred embodiments thereof, but it will be understood that improvements and modifications can be effected within the spirit of the invention.

What is claimed is:

1. A polymer blend composition comprising a polymer that is miscible with polystyrene and a thermoplastic polyester wherein the diacid component of said polyester includes aromatic groups and wherein the diol component comprising at least about 20 percent by weight of a noncyclic, aliphatic diol, said blend further comprising a copolymer compatibilizer in an amount sufficient to effect compatibility between said polymer that is miscible with polystyrene and said polyester, said compatibilizer comprising a copolymer having repeating units derived from aromatic vinyl compound monomers and repeating units derived from vinylphenol monomers and represented by the formula:

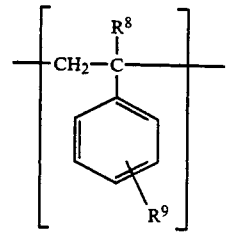

wherein $R^8$ is hydrogen or methyl and $R^9$ is selected from the group consisting of —OH, —OSi($R^{10}$)$_3$, —OM, tBOC, —OCOR¹⁰, where M is a metal cation and R¹⁰ is selected from alkyl groups having from 1 to 5 carbon atoms or an aryl.

2. A polymer blend composition according to claim 1 wherein said polymer that is miscible with polystyrene is a polyphenylene oxide containing polymer derived from a phenol represented by the formula:

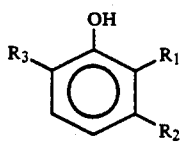

wherein $R^1$ represents a lower alkyl group having from 1 to about 3 carbon atoms and B2 and R3 each independently represent a hydrogen atom or a lower alkyl group having from 1 to about 3 carbon atoms.

3. A polymer blend composition according to claim 1 wherein said polymer that is miscible with polystyrene is tetramethylbisphenol-A polycarbonate.

4. A polymer blend composition according to claim 1 wherein said polymer that is miscible with polystyrene is polystyrene.

5. A polymer blend composition according to claim 1 wherein said thermoplastic polyester includes repeating units represented by the formula:

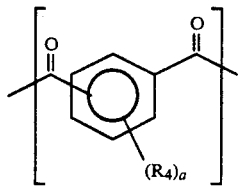

OR

-continued

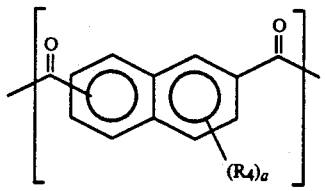

wherein a is an integer of from 1 to 4 and each $R_4$ is independently selected from the group consisting of hydrogen; alkyl groups having from 1 to about 4 carbon atoms, and halogen.

6. A blend according to claim 5 wherein said repeating units are derived from phthalic acid; isophthalic acid; terephthalic and naphthoic acid.

7. A polymer blend composition according to wherein said thermoplastic polyester includes repeating units derived from diols which include: ethylene glycol, butanediol, cyclohexylene dimethanol, 1,2-propanediol and neopentyl glycol.

8. A polymer blend composition according to claim 1 wherein said compatibilizer includes repeating units derived from an aromatic vinyl compound monomer and represented by the formula:

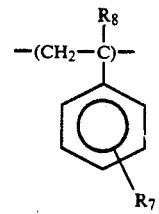

wherein $R_6$ and $R_7$ are independently selected from the group consisting of a hydrogen atom, a lower alkyl group having from 1 to about 6 carbon atoms, a chlorine atom and a bromine atom.

9. A polymer blend composition according to claim 8 wherein said aromatic vinyl compound monomer is selected from the group consisting of styrene, p-methylstyrene, α-methylstyrene, t-butylstyrene, and copolymers thereof.

10. A polymer blend composition according to wherein $R^8$ is hydrogen and $R^9$ is an —OH located in a para position.

* * * * *